United States Patent
Jones

(10) Patent No.: US 9,104,860 B2
(45) Date of Patent: *Aug. 11, 2015

(54) SYSTEMS, METHODS AND MEDIA FOR MANAGING PROCESS IMAGE HIJACKS

(71) Applicant: AppSense Limited, Warrington (GB)

(72) Inventor: Stephen Jones, Manchester (GB)

(73) Assignee: APPSENSE LIMITED, Warrington (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/787,103

(22) Filed: Mar. 6, 2013

(65) Prior Publication Data

US 2013/0326618 A1    Dec. 5, 2013

(30) Foreign Application Priority Data

May 29, 2012 (GB) .................................. 1209463.7

(51) Int. Cl.
 *G06F 11/00* (2006.01)
 *G06F 12/14* (2006.01)
 *G06F 12/16* (2006.01)
 *G06F 21/52* (2013.01)

(52) U.S. Cl.
 CPC ..................................... *G06F 21/52* (2013.01)

(58) Field of Classification Search
 CPC .................................................. G06F 21/52
 USPC .................................................... 726/22
 See application file for complete search history.

(56) References Cited

U.S. PATENT DOCUMENTS

| | | | |
|---|---|---|---|
| 6,698,016 B1 | 2/2004 | Ghizzoni | |
| 6,848,106 B1* | 1/2005 | Hipp | 719/312 |
| 7,472,288 B1 | 12/2008 | Chou et al. | |
| 8,065,734 B1 | 11/2011 | Kennedy | |
| 2003/0081685 A1* | 5/2003 | Montgomery | 375/240.24 |
| 2004/0015712 A1 | 1/2004 | Szor | |
| 2009/0199297 A1 | 8/2009 | Jarrett et al. | |

OTHER PUBLICATIONS

Johny Srouji;A Transparent Checkpoint Facility On NT; Aug. 3-4, 1998; USENIX; pp. 1-10.*
Combined Search and Examination Report issued by the Intellectual Property Office for the United Kingdom for Application No. GB1209463.7, 6 pages, mailed on Sep. 17, 2012.
Liu, L. et al., "Malyzer: Defeating Anti-detection for Application-Level Malware Analysis," Proceedings of the 7th International Conference on Applied Cryptography and Network Security, pp. 201-218, Available from <http://dx.doi.org/10.1007/978-3-642-01957-9_13> (2009).

* cited by examiner

*Primary Examiner* — Monjour Rahim
(74) *Attorney, Agent, or Firm* — Wilmer Cutler Pickering Hale and Dorr LLP

(57) ABSTRACT

Disclosed is a method of checking the authenticity of an executable process including at least one section. The method includes, when an initial thread of the executable process is created in a suspended state, mapping from storage a copy of the executable process into a spare memory area, where it will not be executed. The method also includes comparing a header of a first section of the executable process with a header of a first section of the copy. The method further includes terminating the executable process when the header of the first section of the executable process and the header of the first section of the copy are not identical.

20 Claims, 2 Drawing Sheets

SYSTEMS, METHODS AND MEDIA FOR MANAGING PROCESS IMAGE HIJACKS

This application claims the benefit of the earliest filing date of U.K. Patent Application No. GB1209463.7, filed on May 29, 2012, which is hereby incorporated by reference herein in its entirety.

TECHNICAL FIELD

The present invention relates to the control of applications running on a computer.

BACKGROUND

There are computer environments where specific users are given only limited rights to perform certain actions. This is quite normal: certain users may have quite basic rights, whereas other users may have administrator rights, allowing them to perform more complex or potentially dangerous actions, such as installing new applications or even running certain pre-installed applications. There is a particular problem in certain forms of managed environment, where a user is able to run an application which itself can incorporate what is effectively a further application in the form of a macro or embedded code, such as Visual Basic (VB) or PowerShell. This form of embedded program is common in applications such as Microsoft Excel®. A user who wants to circumvent or frustrate certain security checks and audit features can run, using the Excel framework, an embedded macro or piece of code which is capable of making calls to the Operating System (OS), allowing the user possibly unlimited access to functions and processes, which would not normally be available to them.

SUMMARY

It is an aim of embodiments of the present invention to identify such threats and to take steps to ensure that any potential sources of vulnerability are dealt with accordingly. According to the present invention there is provided an apparatus, method and media as set forth in the appended claims. Other features of the invention will be apparent from the dependent claims, and the description which follows.

According to one embodiment of the present invention, there is provided a method of checking authenticity of an executable process. The method includes, when an initial thread of an executable process mapped to a first area of a memory is created in a suspended state, mapping from a disk storage an image of the executable process to a second area of the memory. The image of the executable process is not for execution. The method also includes comparing a header of a first section of the executable process mapped to the first area of the memory with a header of a first section of the image of the executable process mapped to the second area of the memory. The method further includes terminating the executable process when the header of the first section of the executable process is not identical to the header of the first section of the image of the executable process. The method also includes generating an event when the executable process is terminated.

The method further includes, when the header of the first section of the executable process is identical to the header of the first section of the image of the executable process, comparing a number of sections included in the executable process with a number of sections included in the image of the executable process. The method also includes terminating the executable process when the number of sections included in the executable process is not identical to the number of sections included in the image of the executable process.

The method further includes, when the number of sections included in the executable process is identical to the number of sections included in the image of the executable process, comparing headers of remaining sections of the executable process with headers of remaining sections of the image of the executable process. The method also includes terminating the executable process when a header of any of the remaining sections of the executable process is not identical to a header of a corresponding section in the remaining sections of the image of the executable process.

The method further includes, when the headers of the remaining sections of the executable process are identical to the headers of the remaining sections of the image of the executable process, comparing contents of all sections of the executable process with contents of all sections of the image of the executable process. The method also includes terminating the executable process when content of any section of the executable process is not identical to content of a corresponding section of the image of the executable process.

In another embodiment, a non-transitory computer readable medium having executable instructions is provided. The executable instructions are operable to cause an apparatus to, when an initial thread of an executable process mapped to a first area of a memory is created in a suspended state, map from a disk storage an image of the executable process to a second area of the memory. The image of the executable process is not for execution. The executable instructions are also operable to cause the apparatus to compare a header of a first section of the executable process mapped to the first area of the memory with a header of a first section of the image of the executable process mapped to the second area of the memory. The executable instructions are further operable to cause the apparatus to terminate the executable process when the header of the first section of the executable process is not identical to the header of the first section of the image of the executable process.

In yet another embodiment, an apparatus for checking authenticity of an executable process is provided. The apparatus includes a memory capable of storing data and a processor. The processor is configured for using the data such that the apparatus, when an initial thread of an executable process mapped to a first area of a memory is created in a suspended state, maps from a disk storage an image of the executable process to a second area of the memory. The image of the executable process is not for execution. The processor is also configured for using the data such that the apparatus compares a header of a first section of the executable process mapped to the first area of the memory with a header of a first section of the image of the executable process mapped to the second area of the memory. The processor is further configured for using the data such that the apparatus terminates the executable process when the header of the first section of the executable process is not identical to the header of the first section of the image of the executable process.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

Figure 1:
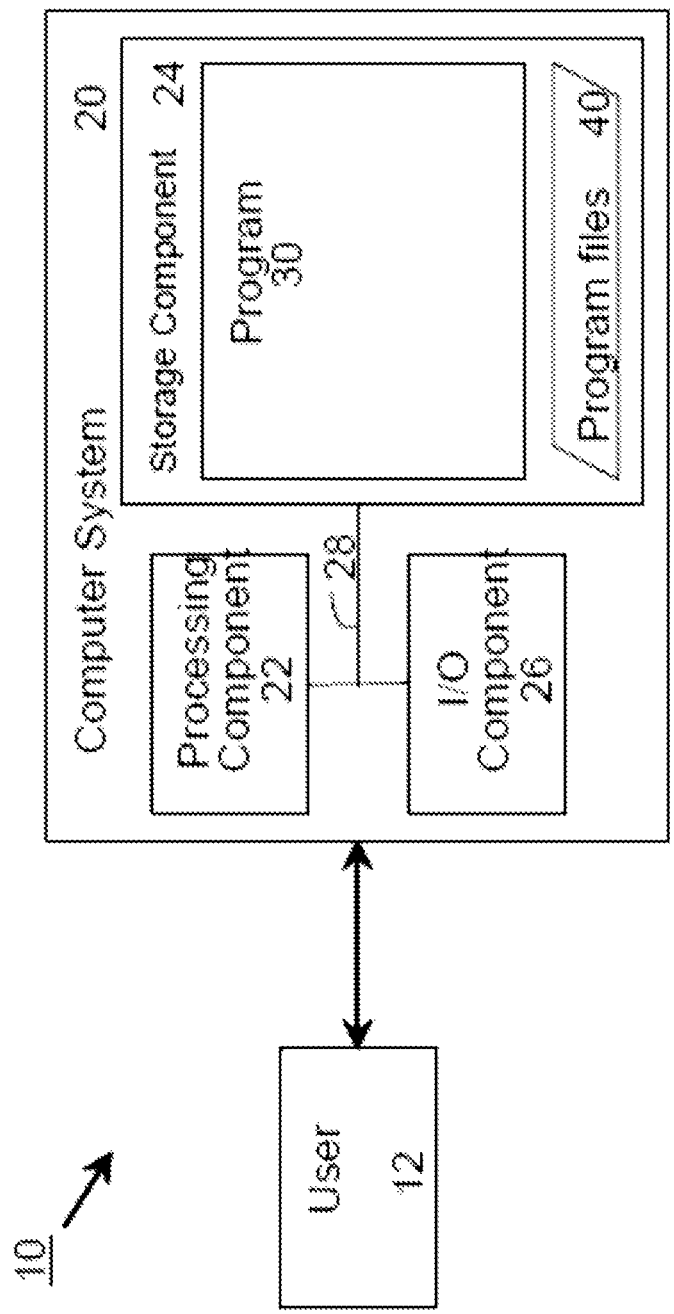
FIG. 1 shows a computer system on which embodiments of the present invention may be configured to run.

FIG. 1 shows an illustrative environment 10 in accordance with an embodiment of the invention. To this extent, environment 10 includes a computer system 20 that can perform methods described herein in order to perform embodiments of the invention. In particular, computer system 20 is shown including a program 30, which makes computer system 20 operable to implement an embodiment of the invention by performing methods described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, program 30 can manage a set of interfaces (e.g., graphical user interface(s), application program interface, and/or the like) that enable human and/or system users 12 to interact with program 30. Further, program 30 can manage (e.g., store, retrieve, create, manipulate, organize, present, etc.) the data, such as a plurality of program/data files 40, using any solution.

In any event, computer system 20 can comprise one or more general purpose computing articles of manufacture (e.g., computing devices) capable of executing program code, such as program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program 30 can be embodied as any combination of system software and/or application software.

Further, program 30 can be implemented using a set of modules. In this case, a module can enable computer system 20 to perform a set of tasks used by program 30, and can be separately developed and/or implemented apart from other portions of program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module may be a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of program 30 fixed thereon (e.g., one or more modules). However, it is understood that computer system 20 and program 30 are only representative of various possible equivalent computer systems that may perform methods described herein. To this extent, in other embodiments, the functionality provided by computer system 20 and program 30 can be at least partially implemented by one or more computing devices that include any combination of general and/or specific purpose hardware with or without program code. In each embodiment, the hardware and program code, if included, can be created using standard engineering and programming techniques, respectively.

When computer system 20 includes multiple computing devices, the computing devices can communicate over any type of communications link. Further, while performing methods described herein, computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

In any event, computer system 20 can obtain data from files 40 using any solution. For example, computer system 20 can generate and/or be used to generate data files 40, retrieve data from files 40, which may be stored in one or more data stores, receive data files 40 from another system, and/or the like.

Currently, if an administrator wishes to restrict a user from potentially embedding dangerous code in an application, the only practical option is to completely disable certain script-based functions from the application. This has the adverse effect of barring certain useful and legitimate functions and features, as well as potentially illicit features.

When a process is created, its initial thread is usually scheduled to run immediately. However, a particular security vulnerability can occur if the initial thread is created in a suspended state. In this form, the code exists in memory, but is not executed immediately. Instead, it awaits a further trigger before it executes. Once it is in memory, it is possible for it to be overwritten before it is executed. Any code which is written over the legitimate code can potentially be used to circumvent security or other policy safeguards, since it has not been subject to any security or audit checks at the time of loading or creation. This is the potential problem which embodiments of the present invention seek to address.

As mentioned, it is not typical, but not totally unheard of, to create the initial thread of a process in a suspended state, so embodiments of the present invention are arranged so that a check is made to determine if the initial thread is created in a suspended state. If it is, then a check is performed to ensure that the code in memory is really the code which was loaded by the program loader and has not been altered in some potentially damaging way after it was loaded, but before it has run. The very fact that the initial thread is created in a suspended state can be used to trigger an alarm condition. An administrator may determine whether to set this option because there may be circumstances in which this is quite legitimate, and the particular policy may depend on local issues. If no alarm condition is created as a result of testing for the creation of a suspended thread, then one or more of the following tests, below, is performed.

There are a number of checks which can be performed to determine if the code in memory is legitimate or not. Firstly, the code will exist in a number of sections, as defined by the particular environment in which the code is intended to operate. For instance, the code may reside in a single section, or it may reside in several different sections, some of which may include data sections, rather than executable code. A first simple check is to ensure that the expected number of sections is present and to trigger an alarm condition if a difference is detected. For instance, if the code is expected to reside in a single section, but the code in memory actually exists in two or more sections, than this can be an indication that something is amiss, and an alarm condition can be triggered.

A more thorough test is to verify the contents of the memory which includes the mapped area of memory to ensure that it corresponds to the expected contents.

In practice, this can be done by reading the original executable or an image thereof from storage, and mapping it to an area of memory as an image file. This can be done by writing code according to the Portable Executable (PE) specification or by use of the known Win32 file mapping APIs. At this point in time, there are two separate areas of memory which, if everything is in order, should contain identical contents. The first is present in a suspended state and waiting to be executed. The second is in an isolated area of memory and exists only to verify the code in the first area of memory.

A completely thorough test is to compare the two areas of memory word by word. This definitive test could take a relatively long time to complete and is not preferred in most situations. However, there may be circumstances when this is desirable and these are described later.

A preferred embodiment of the present invention checks only section headers. Since section headers include information including the name of the section, its size, its location in memory and its characteristics. If the code included in a section has been altered in any way, then the section header will necessarily be different. As such, checking only the section header can act as a proxy for checking the entire content of the section in question.

However, in certain circumstances, and to be absolutely sure that a section has not been modified, it may be desirable to further check the entire section and perform a byte-by-byte or bit-by-bit comparison. Such a check would impose a higher computational overhead on the system, but it may be desirable. In particular, it is conceivably possible, although difficult, to change a section such that the header appears to be correct but the section content has been altered.

Situations where a more comprehensive check may be necessary are to address known forms of compromise attack or if a particular section is known to be vulnerable for any reason. However, a decision to resort to such comprehensive checks should be balanced against the potential risks involved.

However, there are certain applications where the application itself alters the section headers in real time. Examples of such applications include Self-extracting (packed) executables which may sometimes modify sections in real-time. Other forms of application, such as third-party monitoring applications (e.g. anti-virus (AV) software or de-bugging utilities) that rely on hooking, can also modify sections in real-time. This means that such applications, even if legitimate, will cause an alarm condition to be triggered. For such applications, an administrator can configure the system such that only the first section header, which will always be predictable, is checked.

If an alarm condition is triggered as a result of the resident code failing any of the aforementioned tests, then an exit process can be called, with or without warning to the user, so that any vulnerabilities are immediately eliminated. If the process exits without warning, then the program will simply appear to cease execution. A message may or may not be sent to the user or an administrator, in accordance with certain preset security policies.

Alternatively, the process may exit with a warning message to the user. The warning message may be preset with a relatively bland warning, merely informing the user that a problem has occurred. A more detailed message may be suitable in some circumstances. The message may request that the user contacts an administrator to discuss the issue, which may allow the administrator to understand what the user was attempting and whether it was an attempt to circumvent security or audit controls.

Figure 2:
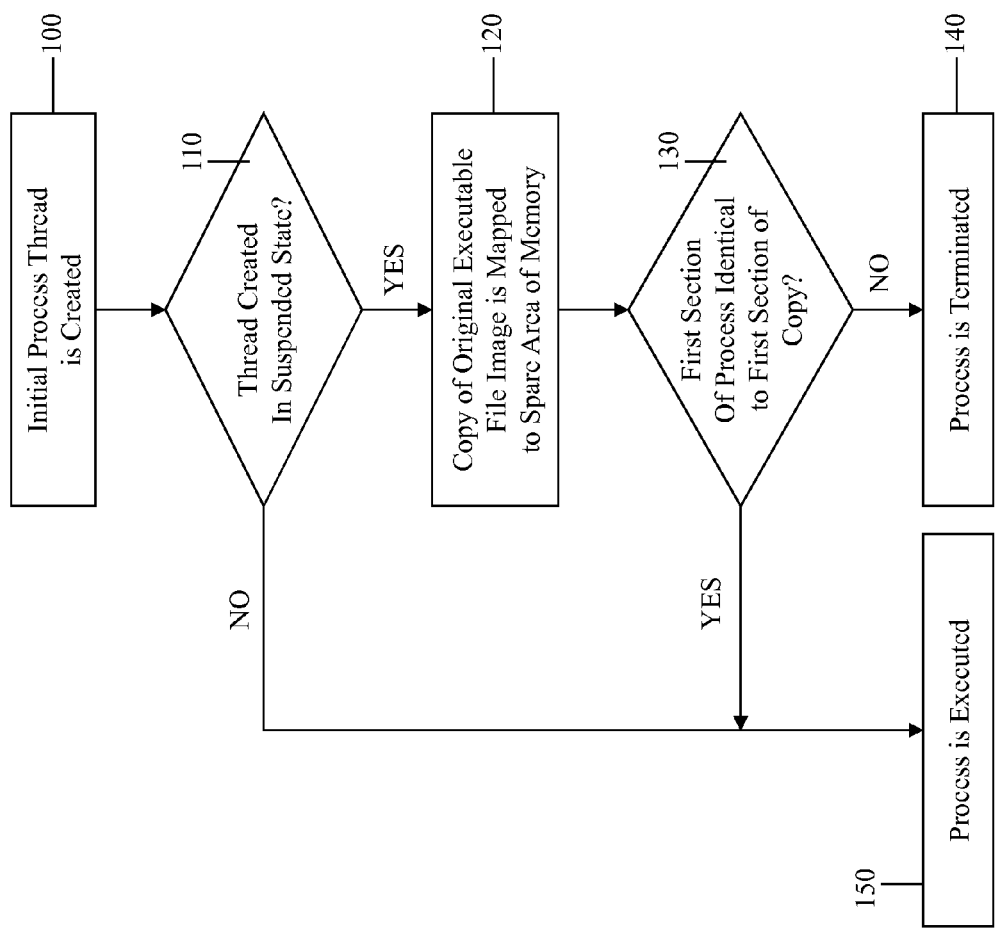
FIG. 2 shows a flowchart according to an embodiment of the present invention.

FIG. 2 shows a simplified flowchart, setting out certain steps according to an embodiment of the present invention. At step 100, the initial process thread is created. At step 110, a check is made to determine if the thread has been created in a suspended state. If it has not, then the thread executes in the normal and moves to step 150—normal thread execution. However, if the thread has been created in a suspended state, at step 120, a copy of the original executable file is mapped into a spare area of memory, where it will not be executed.

At step 130, the content of the first section of the executable process is compared with the content of the first section in the copy. If these are found to be identical, then the normal execution proceeds at step 150. However, if they are found to differ, then this is an indication that the executable code has potentially been compromised and the executable process is terminated at step 140. It is important to note that by use of this technique, the suspended thread never executes and so it is completely isolated while the check is performed.

It can be seen that the flowchart of FIG. 2 can be easily adapted to incorporate the additional checks and features referred to above.

Embodiments of the present invention allow an administrator to effectively control the execution of embedded code within a certain environment. In particular, an attempt to circumvent security and access policies by concealing inappropriate code, for example, in another application, can be detected and neutralized by means of embodiments of the present invention.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of checking for authenticity of an executable process, comprising:
   when an initial thread of an executable process mapped to a first area of a memory is created in a suspended state, mapping from a disk storage an image of the executable process to a second area of the memory, wherein the image of the executable process is not for execution;
   comparing a header of a first section of the executable process mapped to the first area of the memory with a header of a first section of the image of the executable process mapped to the second area of the memory; and
   terminating the executable process when the header of the first section of the executable process is not identical to the header of the first section of the image of the executable process.

2. The method of claim 1, further comprising,
   when the header of the first section of the executable process is identical to the header of the first section of the image of the executable process, comparing a number of sections included in the executable process with a number of sections included in the image of the executable process; and
   terminating the executable process when the number of sections included in the executable process is not identical to the number of sections included in the image of the executable process.

3. The method of claim 2, further comprising generating a first event when the executable process is terminated.

4. The method of claim 2, further comprising,
   when the number of sections included in the executable process is identical to the number of sections included in the image of the executable process, comparing headers of remaining sections of the executable process with headers of remaining sections of the image of the executable process; and
   terminating the executable process when a header of any of the remaining sections of the executable process is not identical to a header of a corresponding section in the remaining sections of the image of the executable process.

5. The method of claim 4, further comprising generating a second event when the executable process is terminated.

6. The method of claim 4, further comprising,
   when the headers of the remaining sections of the executable process are identical to the headers of the remaining sections of the image of the executable process, comparing contents of all sections of the executable process with contents of all sections of the image of the executable process; and
   terminating the executable process when content of any section of the executable process is not identical to content of a corresponding section of the image of the executable process.

7. The method of claim 6, further comprising generating a third event when the executable process is terminated.

8. The method of claim 7, wherein the third event includes an alarm that can be raised for a user or an administrator.

9. A non-transitory computer readable medium having executable instructions operable to cause an apparatus to:
   when an initial thread of an executable process mapped to a first area of a memory is created in a suspended state, map from a disk storage an image of the executable process to a second area of the memory, wherein the image of the executable process is not for execution;
   compare a header of a first section of the executable process mapped to the first area of the memory with a header of a first section of the image of the executable process mapped to the second area of the memory; and
   terminate the executable process when the header of the first section of the executable process is not identical to the header of the first section of the image of the executable process.

10. The computer readable medium of claim 9, wherein the executable instructions are further operable to cause the apparatus to,
    when the header of the first section of the executable process is identical to the header of the first section of the image of the executable process, compare a number of sections included in the executable process with a number of sections included in the image of the executable process; and
    terminate the executable process when the number of sections included in the executable process is not identical to the number of sections included in the image of the executable process.

11. The computer readable medium of claim 10, wherein the executable instructions are further operable to cause the apparatus to generate a first event when the executable process is terminated.

12. The computer readable medium of claim 10, wherein the executable instructions are further operable to cause the apparatus to,
    when the number of sections included in the executable process is identical to the number of sections included in the image of the executable process, compare headers of remaining sections of the executable process with headers of remaining sections of the image of the executable process; and
    terminate the executable process when a header of any of the remaining sections of the executable process is not identical to a header of a corresponding section in the remaining sections of the image of the executable process.

13. The computer readable medium of claim 12, wherein the executable instructions are further operable to cause the apparatus to generate a second event when the executable process is terminated.

14. The computer readable medium of claim 12, wherein the executable instructions are further operable to cause the apparatus to,
    when the headers of the remaining sections of the executable process are identical to the headers of the remaining sections of the image of the executable process, compare contents of all sections of the executable process with contents of all sections of the image of the executable process; and
    terminate the executable process when content of any section of the executable process is not identical to content of a corresponding section of the image of the executable process.

15. The computer readable medium of claim 14, wherein the executable instructions are further operable to cause the apparatus to generate a third event when the executable process is terminated.

16. An apparatus for checking authenticity of an executable process, comprising:
    a memory capable of storing data; and
    a processor configured for using the data such that the apparatus:
       when an initial thread of an executable process mapped to a first area of a memory is created in a suspended state, maps from a disk storage an image of the executable process to a second area of the memory, where the image of the executable process is not for execution;

compares a header of a first section of the executable process mapped to the first area of the memory with a header of a first section of the image of the executable process mapped to the second area of the memory; and terminates the executable process when the header of the first section of the executable process is not identical to the header of the first section of the image of the executable process.

17. The apparatus of claim 16, wherein the processor is further configured for using the data such that the apparatus, when the header of the first section of the executable process is identical to the header of the first section of the image of the executable process, compares a number of sections included in the executable process with a number of sections included in the image of the executable process; and terminates the executable process when the number of sections included in the executable process is not identical to the number of sections included in the image of the executable process.

18. The apparatus of claim 17, wherein the processor is further configured for using the data such that the apparatus generates a first event when the executable process is terminated.

19. The apparatus of claim 17, wherein the processor is further configured for using the data such that the apparatus, when the number of sections included in the executable process is identical to the number of sections included in the image of the executable process, compares headers of remaining sections of the executable process with headers of remaining sections of the image of the executable process; and terminates the executable process when a header of any of the remaining sections of the executable process is not identical to a header of a corresponding section in the remaining sections of the image of the executable process.

20. The apparatus of claim 19, wherein the processor is further configured for using the data such that the apparatus, when the headers of the remaining sections of the executable process are identical to the headers of the remaining sections of the image of the executable process, compares contents of all sections of the executable process with contents of all sections of the image of the executable process; and terminates the executable process when content of any section of the executable process is not identical to content of a corresponding section of the image of the executable process.

\* \* \* \* \*